Dec. 25, 1928.
J. H. THOMPSON
1,696,424
COMPRESSION AND SUCTION SAVING CONSTRUCTION FOR PISTON RINGS
Filed Sept. 18, 1924
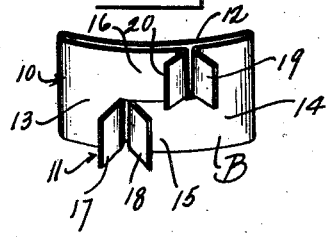
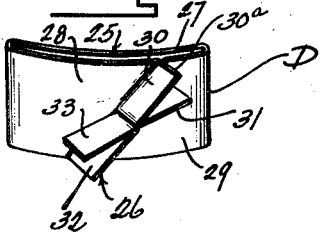
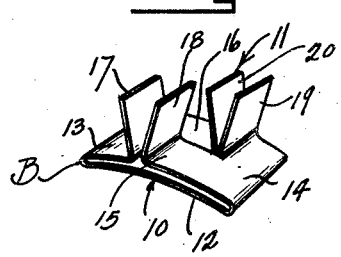
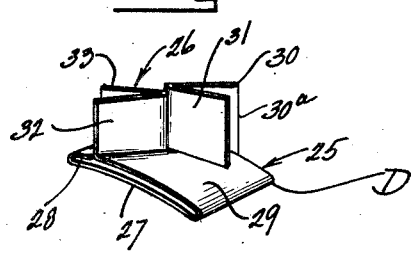
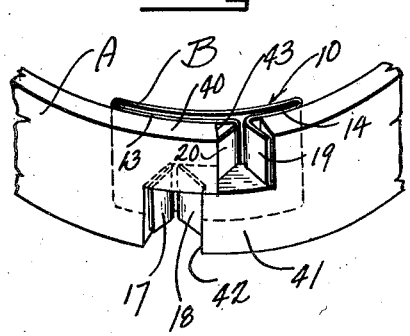
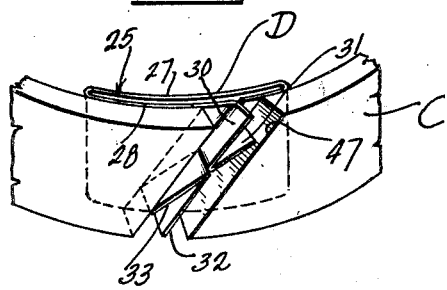
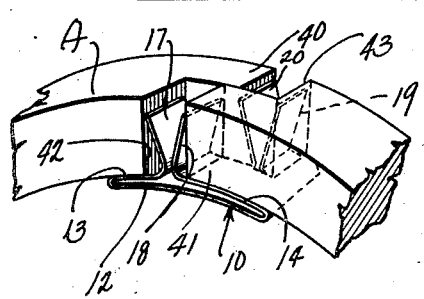
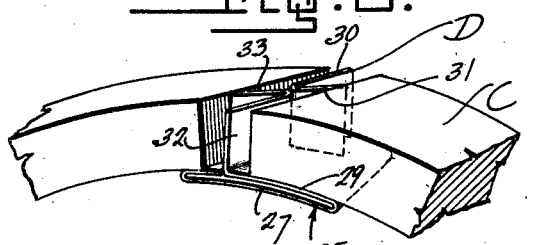
Inventor
James H. Thompson
By Lancaster and Allwine
Attorneys Patented Dec. 25, 1928.

1,696,424

UNITED STATES PATENT OFFICE.

JAMES HORACE THOMPSON, OF NEW SMYRNA, FLORIDA.

COMPRESSION AND SUCTION SAVING CONSTRUCTION FOR PISTON RINGS.

Application filed September 18, 1924. Serial No. 738,428.

This invention relates to an improved piston ring structure, or an attachment for use in connection with piston rings, which is relatively simple and effective in character to prevent loss of suction effort incident to piston action.

The primary object of this invention is the provision of a piston ring attachment which is adapted to function in the cut, lap, or step of any type of piston ring, for the purpose of expanding the piston ring to insure effective sealing engagement with the cylinder walls, and for the purpose of rendering the step, cut, or lap of the ring itself leak-proof even though the piston ring is expanded beyond normal.

After an engine has been used for the considerable period of time the piston rings wear the cylinder walls to a larger diameter where the piston rings reciprocate than at other parts of the cylinders where there is less friction. When this occurs the ordinary piston ring expands to such size at the larger diameter of the cylinder that the seal at the joint of the piston ring is destroyed, and loss in compression and suction results. There are several remedies now known for preventing lowering of engine efficiency. Probably the cheapest of these remedies now known is that of replacement of the old piston rings by new piston rings, since the old piston rings are more or less "set" whereas the new piston rings are expansible. There are numerous faults in connection with such replacement of piston rings. First, the new piston rings are perfectly circular in their expansive action, and do not snugly fit the cylinder walls, for very often the cylinder walls are worn eccentric. Second, the new piston rings expand to a considerable diameter and destroy the seal at the lap or other joint thereof, resulting in loss of compression and suction efficiency. Another remedy is that of reboring the engine cylinders and fitting them with new pistons and new piston rings. The cost of this operation is prohibitive, and does not immediately solve the problem, for many hours of working operation are required to wear in and obtain good compression and suction. With my improved attachment, however, the old piston rings are utilized, and the attachment fitted quickly into place at the joint of the piston ring, without any necessary alteration in the piston ring construction. The attachment gives "life" to the piston ring, by resiliently acting on the same to expand it, and as the attachment is located in the joint of the ring, the same effectively seals the joint to prevent loss of compression and suction effort. Thus, the relatively simple attachment immediately solves the problem, without the necessity of "running in" new piston rings or new pistons in rebored cylinders, and the attachment is effective in operation for a period of use equivalent to or greater than the increased operating efficiency incident to the provision of new pistons or rebored cylinder and piston replacements.

A further object of this invention is the provision of a novel type of spring steel attachment for use in connection with piston rings adapted to exert a resilient effect in the joint at the split of piston rings.

Other objects and advantages of this invention will be apparent during the course of the following detailed description.

In the accompanying drawing, forming a part of this specification, and wherein similar reference characters designate corresponding parts throughout the several views, Figures 1 and 2 are perspective views of the novel type of piston ring attachment designed to be used in connection with the lap joint type of piston ring.

Figures 3 and 4 are perspective views showing the lap joint of a piston ring with the improved attachment associated therewith.

Figures 5 and 6 are perspective views of a modified form of attachment for use in connection with the diagonal split joint of piston rings, although embodying novel characteristics common to the form illustrated in Figures 1 to 4 inclusive.

Figures 7 and 8 are perspective views of the improved attachment as used in the diagonal split at the joint of this type of piston ring.

In the drawing, wherein for the purpose of illustration are shown preferred embodiments of the improved device, the letter A may generally designate any approved type of piston ring with a lap joint, and with which the preferred type of improved attachment B is used. The letter C may generally designate any approved type of piston ring having a diagonal split joint, within which is adapted to be used the improved type of attachment D.

The type of piston A has a lap joint which consists of the overlapping tongues 40 and 41 which, as is well known, provide the offset recesses 42 and 43 when the ring A is expanded, although for normal expansion the reduced tongues 40 and 41 always overlap so that the recesses 42 and 43 never communicate. However, in the case of old piston rings, as above described, the sealing connection is destroyed. In the type of piston ring C, the diagonal split 47 is provided at the juncture at the ends of the ring, and which is a conventional type of joint for piston rings.

Referring to the improved attachment B, the same is adapted for use with the lap joint of piston ring A, and is preferably formed of spring steel metal, having a good resiliency, and being capable of withstanding heat; cold; and subjection to salt water, chemicals, or gases, without losing the general property of resiliency. Other materials than spring steel may be used if desired. This attachment B comprises the body portion or back 10, laterally from which the resilient lip construction 11 extends.

The attachment B is preferably formed from a strip of spring steel metal formed of a width equivalent to the width of the piston ring with which it is associated. It is bent intermediate the ends thereof to provide the concavo-convex inside wall 12 with the concavo-convex outside wall portions 13 and 14 overlying in conforming relation thereto; the portions 12, 13 and 14 providing the concavo-convex body or back portion 10 of the attachment B, as is illustrated in the drawing. The wall portions 13 and 14 are bent over the convex side of the rear wall 12, and at their free ends said wall portions 13 and 14 have interfitting tongue portions 15 and 16, which are reduced in width with respect to the width of the back or body portion 10, and which preferably lie in the same plane. The tongue portions 15 and 16, at the outer edges thereof, are bent in laterally extending relation from the body portion 10, providing lips 18 and 20 respectively, in offset relation. A lip 17 is bent or formed in V-shaped relation with the lip 18, from the wall portion 13 at one side of the attachment B; the lips 17 and 18 cooperating in V-shaped relation laterally extending from the body portion 10, and providing a pair of resiliently disposed lips which are adapted to cooperate in one of the pockets or gaps 42 or 43 at the joint of the piston ring A. In similar manner a lip 19 is outwardly struck or formed from the wall portion 14 of the body 10, in V-shaped outwardly divergent relation with respect to the lip 20, and cooperating in resilient manner with the latter to provide a pair of expansible lips adapted to cooperate in the other of the pockets or gaps of the piston ring A. The pairs of V-shaped lips thus formed on the body 10 are relatively offset, and are interchangeable in so far as their positioning in the gaps 42 or 43 is concerned.

In view of the simplicity of the attachment B the body portion and lip construction thereof may be readily cut and pressed into shape. In the assemblage of the attachment upon the lap joint type of piston ring, the concavo-convex body portion 10 fits between the inner periphery of the piston and the piston ring seat on the cylinder, with the body portion wall sections 13 and 14 in engagement with the inner periphery of the piston ring across the lap joint to seal the same. The set of lips 17 and 18 are compressed into lateral extension in one of the gaps or pockets, as 42, and the other pair of lips 19 and 20 are similarly compressed into the gap 43. The resilient action of the lips in the gaps, operating on the facing edges at the split of the ring A tend to circumferentially expand the ring to greater diameter. From this it can be seen that old piston rings, which have become "set", will be given a new expansive action in the cylinder, and notwithstanding the wide or communicating gaps of the step joint, the compression and suction effort is not lost, because the body portion 10 fits at the rear of the piston ring into sealing engagement across the gaps, and because the lips extending throughout the height of the gaps prevent the loss of compression and suction effort by forming baffles in said gaps or pockets.

Referring to the form of attachment D, as used with the diagonal cut piston ring C, the same comprises a body portion 25 and a lip construction 26. The attachment D is formed from a strip of spring steel or other metal possessing the characteristics above defined for the attachment B, and the back construction or body portion 25 is analogous to the body portion 10 and the same is concavo-convex in length and comprises a rear wall 27 from the ends of which are bent the other wall portions 28 and 29 at the convex side of the rear wall 27.

The lip construction 26 is entirely different from the lip construction of the attachment B, as to form. At the free end of the wall portion 28 a lip 30 is bent, substantially in lateral right angled relation from the body 25 between the ends thereof; said lip 30 being diagonally arranged as to the width of the body 25, and so that the outer edge 30ª thereof is preferably flush with the adjacent edge of the body 25. This diagonally disposed lip 30 extends for substantially one-half the diagonal width of the body portion 25, and the lip 30 at its end opposite the edge 30ª is provided with a lip 31 bent integrally therefrom in V-shaped relation; said lips 30 and 31 being resiliently mounted in laterally extending relation from the body 25 substantially to one side of the longitudinal center of the body 25.

The cooperating wall portion 29 of the body 25 at its edge adjacent the wall portion 28 is provided with a laterally bent diagonally disposed lip 32, arranged in the same plane as the lip 30, and preferably having its outer edge flush with the adjacent edge of the body 25. At its inner edge the lip 32 has a lip 33 bent therefrom in V-shaped relation; the lip 33 being bent at the opposite side of the plane of the lips 30 and 32, to that side to which the lip 31 extends. The lips 31 and 33 are thus placed in substantially the same plane, and they are respectively resiliently associated with the lips 30 and 32 in providing pairs of V-shaped lip arrangements adapted to fit in the diagonal gap or pocket 47 of a piston ring, such as the type C.

In use the attachment D is cooperatively placed at the inner periphery of the piston ring C with the body portion 25 extending across the diagonal gap or pocket at the split of the ring C, and with the pairs of V-shaped lips extending into the gap or pockets 47 to exert a circumferential expansive force on the piston ring C tending to increase the diameter thereof. It is to be particularly noted that the apices of the pairs of V-shaped lips are disposed in adjacent relation, and from these apices the said lips diverge in V-shaped relation towards the upper and lower edges of the piston ring C. Thus, the V-shaped lip structure at the top of the diagonal gap 47 prevents the loss of any compression leaking downwardly through the gap, and similarly the inverted V-shaped lip structure at the power portion of the diagonal slot 47 prevents any compression leaking upwardly through the cut or gap from below. This obviates loss of power, suction, and prevents oil pumping.

From the foregoing description of this invention it is apparent that a novel type of piston ring attachment has been provided, which while relatively simple is formed to most efficiently cooperate in rendering old piston rings useful for considerably extended periods of time, without the attendant loss of compression and suction effort. The attachments while shown for the lap joint and diagonal cut piston ring types may fit any type of piston ring. It is contemplated that the piston rings may be filed off in the back adjacent the slots or cuts at the split of the ring, in order to more snugly accommodate the body and lip structures of the attachment; this feature depending altogether upon how loosely the piston ring fits and seats.

Various changes in the shape, size, and arrangement of parts may be made to the form of invention herein shown and described, without departing from the spirit of this invention or the scope of the claims.

I claim:

1. In a piston ring construction the combination of a ring-shaped body having a split thereacross to permit expansion of the ring, and a resilient V-shaped member in said split including arm portions bearing at their free ends against the facing end edges of the ring-shaped body to normally force said ends apart to expand the ring.

2. An attachment for use in the gap of piston ring constructions comprising a body portion adapted to entirely overlap the gap at the inner periphery of the piston ring and including a portion adapted to project into the area of the gap, said last mentioned portion including resiliently spaced lips engaging at their free ends against the opposite end edges of the ring to normally urge the same apart and the ring into expanded relation.

3. In combination with a split piston ring body of an expansible nature to provide a gap at said split at the ends of the body, and an attachment including a body portion adapted for positioning at the inner periphery of the piston ring across said gap and including a pair of V-shaped arranged resiliently supported lips extending into the gap.

4. In an attachment of the class described the combination of a concavo-convex supporting body, and a pair of resiliently supported lips extending laterally from the body in divergent relation with respect to each other.

5. As an article of manufacture an attachment for piston rings formed of sheet metal bent to provide a substantially concavo-convex supporting body having the ends thereof bent in laterally extending relation between the ends of said body to provide divergent lips in resiliently supported relation.

6. In a piston ring construction the combination of a split ring body including a gap between the ends thereof, and an attachment for association with the piston ring at the split thereof including a body portion extending entirely across the gap of the ring at the inner periphery of the ring, and a resilient portion extending into the gap of the ring and compressed therein to force the ends of the ring apart for expanding the ring.

7. In combination with piston rings including a split ring-shaped body portion having reduced ends adapted to overlap to provide a pair of gaps which are offset transversely from each other about the ring, and an attachment for expanding the ring comprising a supporting body for abutment against the ring, and offset pairs of lips supported upon the body in laterally extending relation into the gaps of the ring and bearing against the end edges of the ring in said gaps to normally expand the ring.

8. An attachment for piston rings comprising a substantially concavo-convex body portion, and upper and lower pairs of relatively diverging lips resiliently connected with the body portion.

9. An attachment for piston rings comprising a body portion, and upper and lower pairs of resilient lips connected with the body portion, the lips of each pair of lips relatively diverging with respect to each other, said pairs of lips being offset with respect to each other along the body portion.

10. An attachment for piston rings comprising a substantially concavo-convex sheet metal body portion including a rear wall and a front wall having overlapping ends intermediate the ends of the body portion, said body portion at its overlapping ends having resiliently connected substantially V-shaped arranged pairs of lips extending laterally from the front wall of the body portion.

11. In combination with a piston ring having lapping ends a curved strip adapted to be placed in the piston groove in rear of the ring and having projections thereon for extending between the ends of the ring.

12. In combination with a piston ring having lapping ends a curved strip adapted to be placed in the piston groove in rear of the ring and having projections thereon for extending between the ends of the ring, said projections being arranged in conformity with the ends of the ring for which it is designed.

JAMES H. THOMPSON.